United States Patent

[11] 3,618,768

[72] Inventor Kenard D. Brown
1227 South Willow St., Casper, Wyo. 82601
[21] Appl. No. 35,660
[22] Filed May 8, 1970
[45] Patented Nov. 9, 1971
Continuation-in-part of application Ser. No. 808,054, Mar. 18, 1969, now abandoned.

[54] LIQUID SWEEPING SYSTEM EMPLOYING HELICAL CONVEYOR METHOD AND APPARATUS
29 Claims, 17 Drawing Figs.

[52] U.S. Cl. .................................................. 210/83, 210/242, 210/DIG. 21
[51] Int. Cl. .................................................. B01d 21/06
[50] Field of Search .................................................. 210/83, 242, 523, DIG. 21

[56] References Cited
UNITED STATES PATENTS
| | | | |
|---|---|---|---|
| 655,045 | 7/1900 | Bender | 210/523 X |
| 2,228,529 | 1/1941 | Moeller | 210/242 |
| 3,221,884 | 12/1965 | Muller | 210/242 |
| 3,348,690 | 10/1967 | Cornelissen | 210/523 X |

Primary Examiner—Reuben Friedman
Assistant Examiner—T. A. Granger
Attorney—McGrew and Edwards ABSTRACT: A method and system for removing light fluid such as oil from heavy fluids such as water comprises an extended length of open screw conveyor constructed of material such that it will float on water. The conveyor may comprise a helical fin having a central bead or core about which stranded cables are wound, the stranded cables may be of steel wire or plastic and when the conveyor is required to float on water, plastic materials are employed for all parts of the conveyor. The conveyor is connected to two spaced motor vessels one end being pivotally connected to one of the vessels for free rotation and the other end passing up into the other vessel through a surrounding conduit and being rotated by a motor mounted on the other vessel. A reservoir is provided in the other vessel to collect the liquid. During operation the cable is rotated in a direction to draw the liquid toward the reservoir vessel and the two vessels are moved forward to sweep an area covered with oil or other lighter fluid. In another embodiment the flexible helical drive member is housed in a flexible tubing having a longitudinal opening for admitting the lighter liquid from the surface of the body of heavy liquid, the entire assembly thus formed floats on the body of liquid.

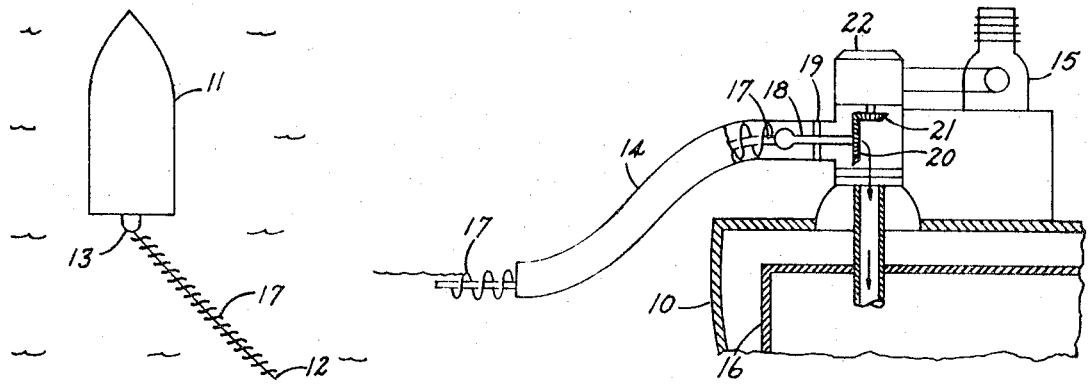
Fig. 2
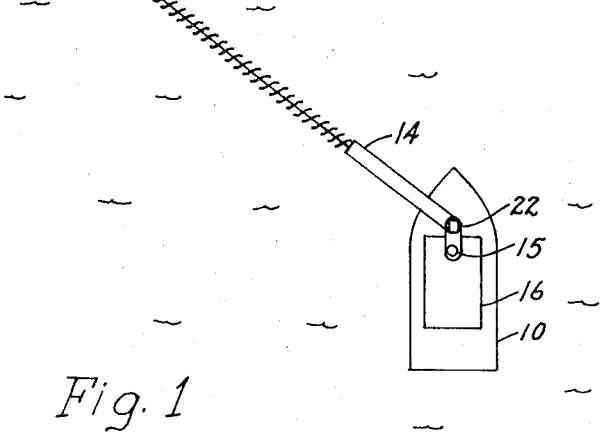
Fig. 1
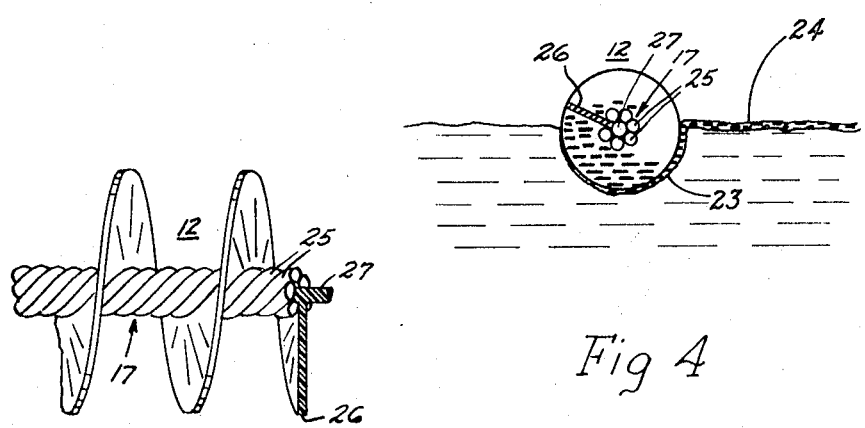
Fig. 3
Fig 4
INVENTOR
KENARD D. BROWN
BY
ATTORNEYS

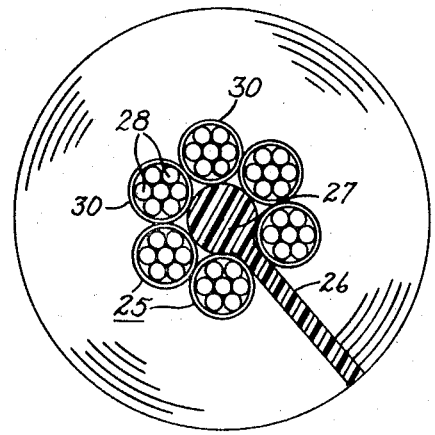
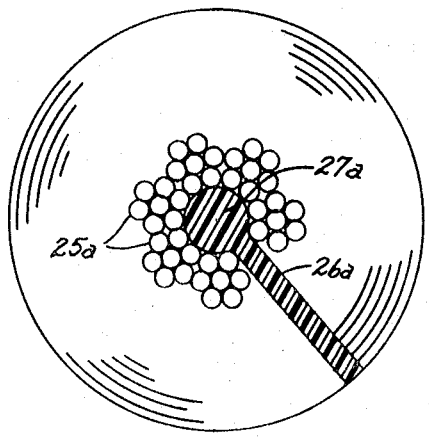
Fig. 5            Fig. 6
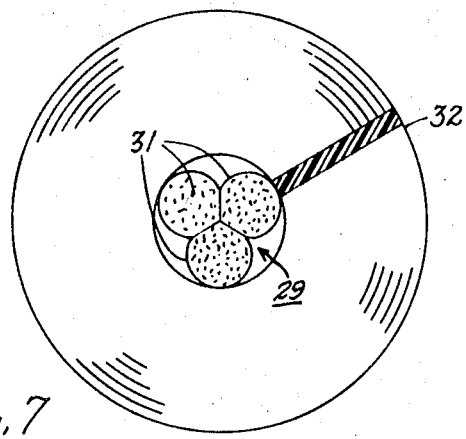
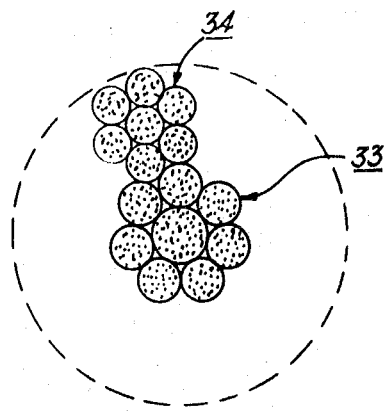
Fig. 7            Fig. 8
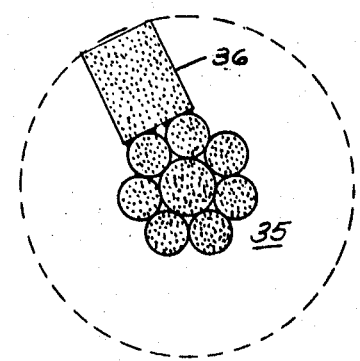
Fig. 9
INVENTOR
KENARD D. BROWN
BY
ATTORNEYS

INVENTOR.
KENARD D. BROWN

ATTORNEYS

LIQUID SWEEPING SYSTEM EMPLOYING HELICAL CONVEYOR METHOD AND APPARATUS

This application is a continuation-in-part of applicant's copending application, Ser. No. 808,054 filed Mar. 18, 1969, now abandoned.

This invention relates to flexible conveyor systems of the screw type and particularly to an improved system for sweeping the surface of a liquid such as water on which there is a layer of a lighter liquid such as oil.

Various arrangements have been proposed and tried for effecting the removal of oils from the surface of water and particularly for removing large quantities of oil such as are released when a tanker is broken open or an underwater oil well leaks oil. These arrangements have included chains of logs drawn across the water by boats and suction devices for collecting the oil accumulated within the barrier thus formed. Such devices have proved successful to some extent, however, they have not been satisfactory for all applications and the use of vacuum devices for removing oil tends to result in removing substantial amounts of water with the oil, and it is, therefore, necessary to settle out the oil after it has been collected in a reservoir. Furthermore, the procedures embodied thus far have been relatively slow in operation. It is desirable to provide a simple and more effective arrangement for removing a lighter liquid from the surface of a body of heavier liquid and, accordingly, it is an object of the present invention to provide an improved system for removing oil or other like liquids from the surfaces of bodies of water or other heavy liquids.

It is another object of this invention to provide a system for collecting oil or other fluids from the surface of bodies of water which is quick and positive in operation and which removes a minimum of water with the lighter liquid.

It is another object of this invention to provide an improved method for removing from a body of liquid a layer of lighter liquid floating on the surface thereof.

It is another object of this invention to provide an improved method for removing oil or other light liquid floating on water and which is usable over a wide range of conditions of motion of the water surface.

Briefly, in carrying out the objects of this invention in one embodiment thereof, an extended helical or screw-type conveyor is constructed by providing a helical fin formed with a bead or bulb adjacent its center and bound by stranded cables wrapped about the central bead and holding the helical fin securely in position. The resulting conveyor is flexible and by constructing the fin and cable components of suitable high-tensile synthetic plastic material the conveyor may be made to float on water. The system employing this conveyor includes two motor-driven vessels between which a length of the conveyor is supported and allowed to float on the water. One end of the conveyor is attached to one of the vessels by a universal pivot, such as a ball joint, and the other end is attached to be driven by a motor in the other vessel. During operation the cable is rotated in a direction to move fluid along the cable toward the driven end of the cable and a reservoir is provided on the vessel at that end of the collection of light fluids flowing toward the cable from the surface of the water. In order to raise the collected oil or other like fluids to the reservoir the end of the cable near the reservoir vessel is surrounded with a suitable tubing thereby providing a spiral pump to lift the liquid into the vessel and deliver it to the reservoir.

In another embodiment the flexible screw or auger member is enclosed in a flexible tubing having a longitudinal opening facing to one side for admitting to the conveyor light liquid from the surface of the body of heavier liquid.

The features of novelty which characterize this invention are pointed out with particularity in the claims annexed hereto and forming a part of this specification. The invention itself however both as to its organization and method of operation together with further objects and advantages thereof will best be understood upon reference to the following description taken in connection with the accompanying drawings in which:

FIG. 1 is a diagrammatic plan view of the system of sweeping oil from water embodying this invention;

FIG. 2 is an enlarged side elevation view of the reservoir vessel of the system of FIG. 1;

FIG. 3 is an enlarged side elevation of a portion of the conveyor of FIGS. 1 and 2;

FIG. 4 is an enlarged sectional elevation view of the conveyor of FIGS. 1 and 2 shown floating on the surface of a body of water;

FIG. 5 is a somewhat diagrammatic cross-sectional view of the helical conveyor of FIG. 1 when constructed entirely of plastic materials;

FIG. 6 is a cross-sectional view similar to FIG. 5 illustrating another embodiment of the conveyor construction;

FIGS. 7, 8 and 9 illustrate further embodiments of the conveyor wherein a helical member is bonded to a central tension carrying rope, the helical member in FIGS. 8 and 9 being ropes and the rope of FIG. 9 being of rectangular cross section;

Figures 10, 11:
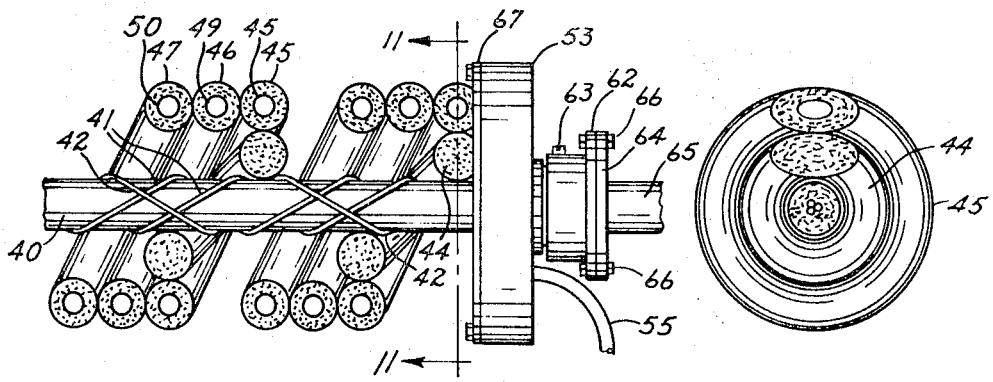
FIG. 10 is a side elevation view partly in section illustrating another embodiment of the invention.
FIG. 11 is a sectional view along the line 11—11 of FIG. 10.

Referring now to the drawings, there is illustrated in FIG. 1 a system for sweeping a layer of oil from water wherein two power boats 10 and 11 are provided and are positioned to travel along spaced parallel courses. An open or unconfined flexible helical conveyor 12 extends between the boats and moves laterally with respect to the surface of the water. The conveyor 12 is constructed of synthetic plastic materials which are lighter than water so that the conveyor can float on the water. The left-hand end of the conveyor 12 as viewed in FIG. 1 is connected to the boat 11 by a free swivel connection indicated at 13 and the right-hand end of the conveyor is anchored to the boat 10. The right-hand end of the conveyor passes through a tube 14 which extends from the surface of the water up into the boat and a motor 15 is mounted in the boat adjacent the conveyor and is connected to rotate the conveyor in a direction tending to move liquid along the conveyor toward the boat 10. Liquid moved along the conveyor is confined when it reaches the tubing 14 in which it fits with minimum clearance and is thereby delivered to a reservoir 16 in the boat.

FIG. 2 is a diagrammatic illustration with the conveyor substantially enlarged in cross section and showing the manner in which oil or other fluid collected by the conveyor may be moved up into the boat and thence into the reservoir 16. This figure also indicates diagrammatically the driving mechanism for the conveyor. The central shaft of the conveyor, indicated at 17, is securely attached to a shaft 18 rotatably mounted on the boat on a bearing block and spider assembly 19 and having bevel gears 20 and 21 arranged between the block and driven by the motor 15 through a variable speed transmission 22. The oil pumped by rotation of the conveyor 12 moves upwardly through the tube 14 and past the spider assembly including the gears 20 and 21 and thence to the reservoir 16, as indicated by arrows. The conveyor tube 14 is rotatable about the vertical axis of the gear 21, so that it may be swung to desired positions around the bow of the boat 10.

The conveyor as illustrated in FIG. 2 is rotated in a counterclockwise direction as viewed from the left end of the conveyor. The conveyor floats on the water and when it is rotated forms a trough 23, as indicated in FIG. 4. Oil or other light liquid floating on the surface of the water, as indicated at 24, flows into this trough and as the conveyor is rotated moves along the trough toward the boat 10. As the boats move together along their parallel courses the conveyor is drawn through the water so that the trough 23 travels laterally over the surface and sweeps the surface of the water at the same time drawing the oil longitudinally of the conveyor toward the boat 10 and into the reservoir 16 thereby removing oil from the surface of the water. By selecting a speed of operation of the rotation of the conveyor 12 and of movement of the boats relatively to the water it becomes possible to move substantially only oil toward the tube 14 and thereby lift oil with little, if any, water with it into the reservoir 16. In the position of the boats in FIG. 1, the water is assumed to be moving directly downwardly past the conveyor; the angular position or slope of the conveyor tends to direct the liquid toward the boat 10 and thus aids the movement of the liquid produced by rotation of the conveyor.

As shown in FIG. 4 the conveyor 12 comprises the core 17 which is a stranded cable comprising a plurality of individual strands 25 and a helical fin or screw 26 as shown in FIG. 3 the screw 26 is formed integrally with a central bead 27 which is locked within the strands 25 of the cable. A screw conveyor constructed in the manner illustrated is highly flexible and may be employed for many screw conveyor purposes and since it may be made in long lengths it is useful not only for sweeping purposes as illustrated in FIG. 1 but for pumping purposes wherein it is confined in a flexible tubing and employed to convey flowable substances including liquids and materials such as grain or silage. For the purpose of sweeping the surface of water as illustrated in FIG. 1, the components of the conveyor are constructed of synthetic plastic materials such as nylon having specific gravity less than that of water so that the conveyor will float on the water.

FIG. 5 illustrates the cross section of the cable when constructed of plastic materials the fin or screw member 26 and its center bead 27 being formed integrally and being held securely in the center of a cable comprising six strands 25 each of which comprises a conventional seven strand cable built up from high-tensile plastic filaments 28 and encased in a tight-fitting plastic tube 30. The figure is diagrammatic in that the cross sections of the strands 28 have been shown as circles rather than ellipses. The friction between the several plastic components is relatively low and on bending of the conveyor the components tend to move and accommodate the distortions while maintaining their relative positions and assuring secure holding of the helical blade in its required position.

In FIG. 6 another embodiment of the conveyor construction is illustrated, and comprises a blade 26a having a central bead 27a and securely bound in a cable comprising a plurality of steel wires 25a. The wires are formed in six cables each comprising the conventional seven strands of wire. For the purpose of minimizing friction in this construction each of the wires is preferably coated with a plastic material which reduces the friction between the wires and affords slight relative movements of the components of the conveyor while maintaining them in their required relative positions, thereby providing a more flexible conveyor construction. The construction of FIG. 6 provides increased tensile strength over that of the plastic cable of FIG. 5 and is particularly suited to the application to closed conveyors wherein the extended length of flexible conveyor is arranged within a tube for forcing flowing material through the tube.

Various other forms of conveyor may be constructed to provide the helical driving fin about a main tension carrying member. For example, as illustrated in FIG. 7, a nylon rope 30 illustrated as comprising three rope strands 31 may be provided with a helical fin 32 which may, for example, be machined from a thick-walled nylon tube and is arranged about the rope 31 in engagement with the rope along the inner edge of the helix. The helix is cemented or otherwise securely attached to the rope along its inner edge either continuously or at spaced intervals.

Another configuration of conveyor suitable for some applications is that indicated in FIG. 8 wherein a main rope 33 shown as of a seven stranded configuration is employed as the main core or tension carrying member. A second similar rope 34 is arranged in helical configuration along the length of the rope 33 and is cemented or otherwise attached to the rope 33 in a manner similar to the attachment of the fin 32 to the rope 29 of FIG. 7, the circumferential outline of the helix being indicated by a dotted circle.

The type of rope selected for this conveyor depends upon its intended use; for floating conveyors the ropes are of nylon or other high-tensile strength light synthetic plastic. The cross section of the helically wrapped rope forming the conveyor is also selected in accordance with the intended use. Woven nylon ropes may be employed for the helix and for a relatively short pitch helix such ropes of rectangular cross section, as shown in FIG. 9, provide effective conveyor actions. In FIG. 9, the central tension rope, indicated at 35 is a conventional nylon rope and is wrapped with helical rope 36 which is a woven or braided nylon rope of rectangular cross section.

Another form of rotor suitable for application in the system and method of the present invention is illustrated in FIGS. 10 and 11. This rotor includes a central tension carrying rope 40 of light synthetic plastic such as nylon and which is bound together tightly by a plurality of cables each comprising a cable wire coated with a synthetic plastic such as nylon and which is stretched in helical configuration about the rope 40. Two of these cables, indicated at 41, are wrapped about the rope 40 in one direction and a third cable 42 is wrapped about the rope in the opposite direction. These cables enter the core of the rope 40 near the right end, as indicated, and pass through the center and out the end of the rope; a metal band 43 is provided about the end of the rope to clamp the end in its round configuration. The helical drive member of the rotor of FIG. 10 comprises a second rope 44 wrapped helically about the rope 40 and securely cemented or otherwise bonded thereto. Three additional ropes 45, 46 and 47 are arranged to complete the helix and to form a channel-shaped pocket facing inwardly toward the rope 40 and defined by the rope 44 and the three ropes 45, 46 and 47. This pocket minimizes the outward movement of liquid radially away from the rope 40, the rope being rotated to move the liquid to the left as viewed in FIG. 10. The rope 45 is cemented or otherwise bonded to the rope 44 and the ropes 46 and 47 are secured to the ropes 45 and 46, respectively, the rope 47 having a slightly lesser radius of curvature than the other ropes provides the cup or channel-shaped pocket about the outer periphery of the helix. The pocket formed by the ropes in the manner illustrated in FIG. 10 retains liquid within the helical pocket and is particularly useful when the rotor is employed as a free rotating element floating in the water.

The rotor of FIG. 10 may be employed in the same manner as the rotors previously described for the purpose of removing oil or similar liquids from the surface of a body of water. For some applications, it may be desirable to provide greater buoyancy than that available with the light plastic alone, and it also may be desirable to adjust the degree of buoyancy. For this purpose, gas chambers may be provided in the structure of the rotor.

As illustrated in FIGS. 10 and 11, each of the ropes 45, 46 and 47 is provided with a hollow tubular center indicated at 48, 49 and 50, respectively. The tubes forming the centers are constructed of a fluidtight material and the buoyancy of the rotor may be changed by changing the fluid content of these tubes. For example, gas such as air may be pumped into the tubes at selected pressures to provide buoyancy as desired, the opposite ends of the tubes being sealed by clamping or in any other suitable manner.

Figure 12:
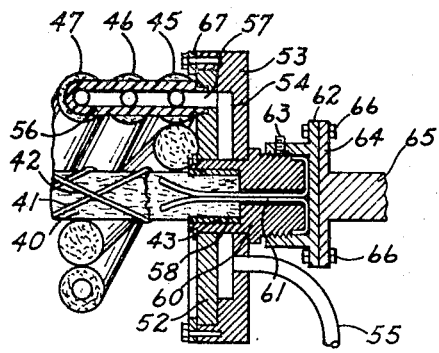
FIG. 12 is a sectional view of the end fitting for the rotor of FIG. 11.

In order to supply the fluid to the tubes 48, 49 and 50, a rotating fluid transfer coupling is provided as illustrated in FIG. 12. This coupling comprises a rotatable member 52 to which the center rope 40 and the cables 41 and 42 are attached and a stationary outer coupling member 53 of cup shape configuration which surrounds the member 52 and is provided with a passage 54 connected with a supply pipe 55 through which air or other fluid at the desired pressure may be admitted. In the embodiment illustrated, the three tubes of the ropes 45, 46 and 47 are connected to a manifold 56 which enters a passage 57 in the rotor 52 and is in communication with the chamber 54. The members 52 and 53 are provided with flat faces in running engagement to form a suitable rotating seal and minimize leakage during relative movement of the two members. The cables 41 and 42 pass from the end of the rope 40 which is seated within a cylindrical recess 58 in the hub of the rotor 52, indicated at 60. The cables are then drawn through an axial passage 61 in the hub and are wrapped around the outer end of the hub and back over the outside thereof where they are clamped into position by a cap coupling 62 which is threaded on the hub 60 and clamps the cables against the end of the hub and between the hub and the cap. The cap may be locked in its clamped position by one or more setscrews, one of which is shown at 63. The rotor is connected to the driving motor of the system, which may be the motor 15 of FIG. 2, by a suitable shaft coupling shown as comprising a plate 64 at the end of a drive shaft 65; the plate is attached to the coupling member 62 by suitable bolts 66.

The rotor 52 and stationary member 53 are held in operative relationship by retaining members, indicated generally at 67. Suitable spring members, (not shown) may be employed to maintain the relatively rotatable elements of the fitting in close-sealing engagement for minimizing the leakage of fluid.

Figure 13:
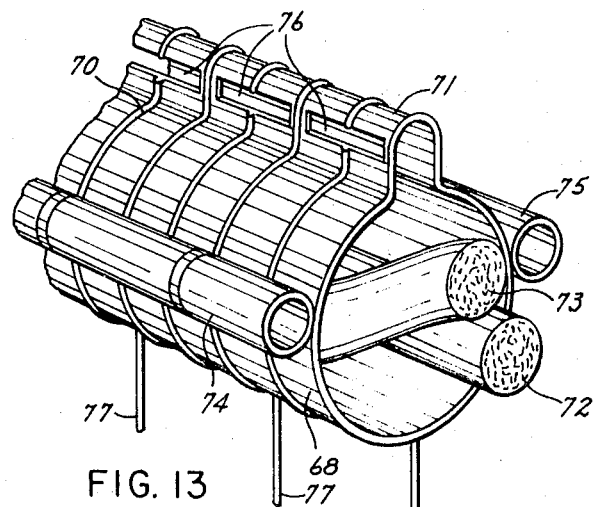
FIG. 13 is a perspective view of a short section of conveyor illustrating another embodiment of the invention.

A further modification of the fluid conveyor for use in the present invention is illustrated in FIG. 13. In this conveyor a helical rope drive member, which has been illustrated as that of FIG. 8, is arranged within a flexible tube 68 of suitable lightweight synthetic plastic material which may be reinforced with glass fibers or other fibrous material. The tube has been illustrated as comprising a thin wall having a helical wire 70 wrapped about and bonded to it to provide the required stiffness of the tube wall while affording flexibility. The tube is provided with an upstanding inverted troughlike portion 71 providing an offset upstanding channel and the main tube has an internal diameter sufficiently large to afford free rotation of the rotor. The rotor comprises a central tension rope 72 and a helically formed rope 73 bonded to the central rope. Horizontal tubes of synthetic plastic material, indicated at 74 and 75, are cemented or otherwise secured to the sides of the tube 68 to provide the desired amount of buoyancy for holding the upper side of the assembly near the surface of the water and in an upright position where oil or other light fluid floating on the surface may be removed through a longitudinal opening. The longitudinal opening has been illustrated as constituting a multiplicity of rectangular openings 76 formed by individual openings between the turns of the wire 70. In the illustrated embodiment every other turn of the wire has been cut at the openings so that each opening has a length twice that of the wire spacing. The tubular rotor assembly as illustrated in FIG. 13 may be made of extended length and be floated on water and is sufficiently flexible to follow swell or wave action. For the purpose of facilitating this following of the wave action, a plurality of drop weights are secured to the bottom of the tube 68 on lines 77.

The tubular conveyor assembly of FIG. 13 may be employed in a manner similar to the assemblies of the embodiments illustrated hereinabove for the purpose of sweeping an area of water to remove oil or other relatively light fluids floating thereon. The buoyancy of the tubular assembly may be adjusted in a manner similar to that employed with the rotor of FIGS. 10, 11 and 12 either by connecting the desired fluid supply to the buoyant member 74 and 75 or by employing in the tube 68 the rotor of FIG. 10.

Figures 14, 15:
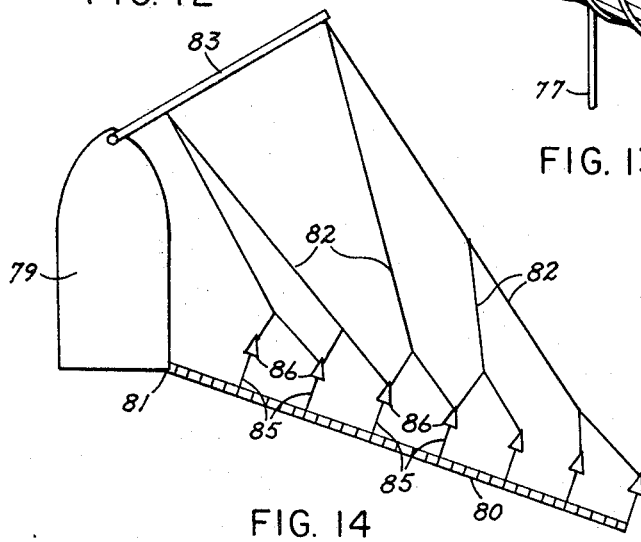
FIG. 14 is a plan view of a towing system for a conveyor of the type of that of FIG. 13.
FIG. 15 is an enlarged view of a portion of an outrigger float of the conveyor of FIG. 14.

The conveyor assembly of FIG. 12 may also be employed with a single boat 79 and a bridle hitch as illustrated in FIG. 14; in this application a length of the conveyor, indicated generally at 80, is secured at one end to the boat as indicated at 81 and is held by bridle lines 82 in a generally straight line. To facilitate the connection of the bridle lines a boom 83 may be attached to the forward end of the boat 79. In addition, in order to stabilize the conveyor assembly, outriggers 85 are employed, each outrigger comprising a rigid arm and a float 86 which has been shown in generally triangular configuration, an enlarged view of the float being illustrated in FIG. 15. The bridle lines are connected to the floats at eyes 87 provided for this purpose and a vane 88 is provided on the bottom of each float and may be adjusted to provide varying degrees of bias of the float away from the boat 79. A reservoir and drive means are located in the boat as in FIG. 2.

Figure 16:
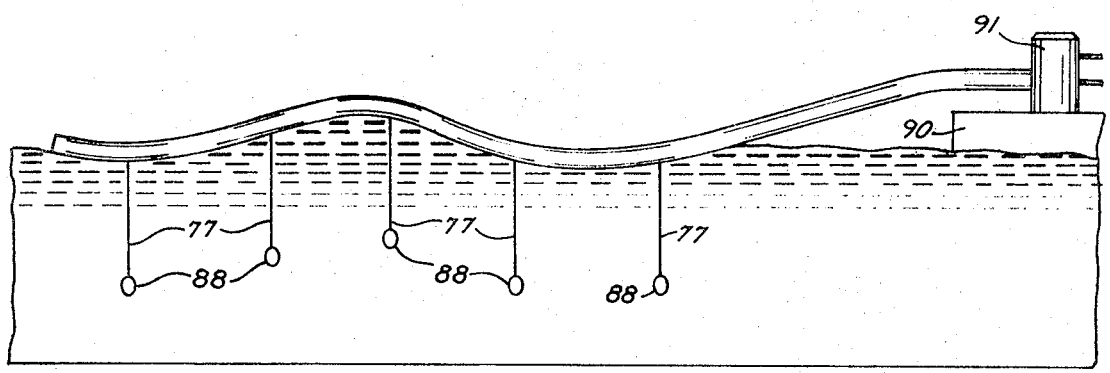
FIG. 16 is a side elevation view of the conveyor of FIG. 13 illustrating its use during wave action.

The action of the assembly of FIG. 13 on water on which there is a swell is indicated in FIG. 16 where the drop lines 77 have been illustrated as carrying weights 88 at their bottom ends. The buoyancy of the assembly is adjusted so that the weights are carried while the inlet opening of the tubing 68 lie adjacent the surface of the body of water, together with the buoyancy of the conveyor assembly facilitates the action of the assembly in following the configuration of the waves, and assures more effective pick up of the lighter fluid floating on the surface which passes through the series of openings comprising the slot 76 along the side of the top ridge of the tube 68. In FIG. 16 the assembly has been illustrated as secured at one end to a floating vessel or boat 90 and as entering a motor drive and liquid pickup chamber 91 on the deck of the vessel.

Figure 17:
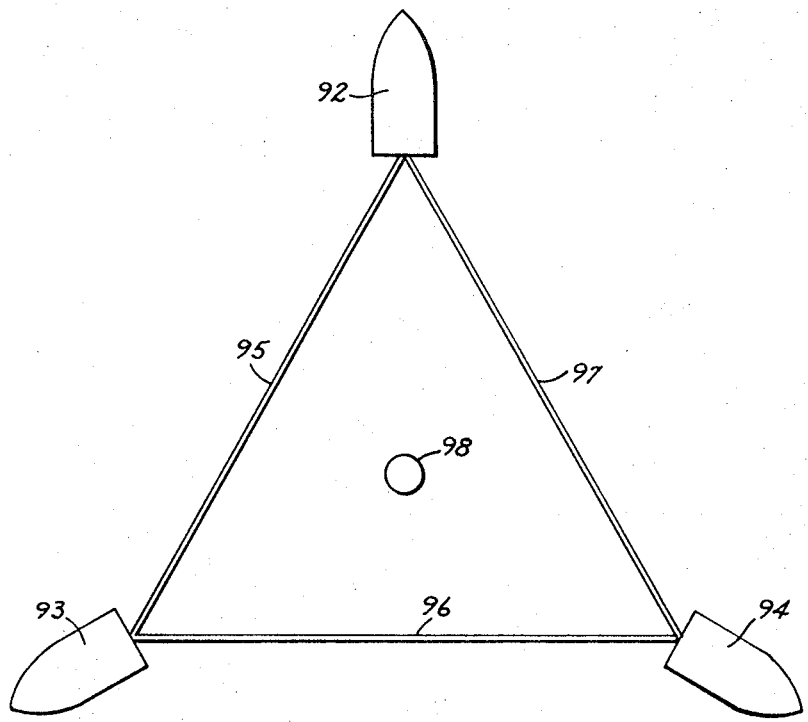
FIG. 17 is a plan view of an oil-removing system employing conveyors of this invention arranged on a body of water in surrounding relationship to a source of oil or other light liquid.

Another manner in which the helical conveyor of this invention may be employed is illustrated in FIG. 17. In this figure, three vessels or boats 92, 93 and 94 have been illustrated in a generally equilateral triangle configuration with conveyor assemblies 95, 96 and 97 extending between respective pairs of the boats. The boats are anchored in position about an oil well or other source of relatively light fluid reaching the surface of the water and indicated at 98. This is thus a stationary installation and is provided in order to minimize the escape of oil or other light liquid flowing from the source 98 onto the water surrounding the area. The conveyor assembly of FIG. 13 is particularly well adapted to this installation wherein the conveyors 95, 96 and 97 are arranged with their slots 76 facing inwardly of the triangle. Tension cables as shown in FIG. 10 may be employed on the other embodiments having control tension ropes, for example, on the rope 72 of FIG. 13.

The invention as described heretofore may be employed by using power boats as indicated in FIG. 1 and may also be employed by anchoring the boats across a harbor or beach to effect a continuous removal of water or other liquid from the surface of the water in selected areas. When oil or other floating liquid is issuing from a stationary surface such as an oil well or other leak under water, the area may be surrounded by a chain of conveyors embodying the invention as illustrated, for example, in FIG. 15 where boats are anchored at suitable distances to support the ends of adjacent conveyors. The buoyancy of the conveyors may be adjusted to conditions within a wide range by employing the constructions of FIGS. 10 and 12 and the construction of FIG. 12 may be used as a single wing sweep as illustrated in FIG. 13.

I claim:

1. The method of removing a light liquid from a body of heavier liquid on which it is floating which comprises providing an extended length of a flexible helical conveyor sufficiently light to float on said body of liquid, floating said conveyor on said body of liquid, rotating said conveyor to move liquid toward one end thereof and at a speed sufficient to form a trough in said body whereby the trough is filled with said light liquid and said light liquid is conveyed toward said one end, providing a reservoir for the liquid, and conducting light liquid from said one end of said conveyor into said reservoir.

2. The method of claim 1 wherein said reservoir is provided above the surface of the liquid.

3. The method of claim 1 including the steps of providing a tubular enclosure about a portion of said conveyor adjacent said one end to confine light liquid therein, and positioning said enclosure to move the light liquid upwardly and into said reservoir.

4. The method of claim 1 wherein light liquid covers a substantial area of the heavier liquid and moving the conveyor laterally over said area to collect light liquid therefrom.

5. The method of claim 1 including the step of providing two floating vessels, anchoring respective ends of the conveyor to said vessels, locating said reservoir in one of said vessels, applying power to said conveyor at one of the ends thereof to rotate the conveyor, spacing the vessels from one another, and moving the vessels to sweep the conveyor over the area therebetween.

6. The method of claim 1 including the steps of providing at least three lengths of conveyor and a corresponding number of floating vessels, anchoring the vessels at spacings of the order of the respective lengths of the conveyors and about an area of the heavy liquid from which light liquid is to be removed, and extending the conveyors between respective pairs of the vessels to define the boundary of the area, and rotating said conveyors concurrently to transfer light liquid from the area into the reservoirs.

7. A system for sweeping oil or other light liquids from the surface of a body of water or the like, comprising an extended length of a lightweight open flexible screw conveyor capable of floating on water means for rotating said conveyor to move light liquid along the conveyor toward one end thereof, reservoir means, means at said one end utilizing a portion of said conveyor for conducting the light liquid into said reservoir means, and means for sweeping the conveyor laterally over the surface of the body of liquid.

8. A system as set forth in claim 7 wherein said sweeping means comprises two motor-driven vessels, said conveyor being rotatably connected to one of said vessels, and said reservoir and said rotating means being located in the other of said vessels.

9. A system as set forth in claim 7 wherein said means for conducting liquid into said reservoir includes a flexible tube closely surrounding said conveyor adjacent said one end.

10. The method of removing a light liquid from a body of heavier liquid on which it is floating which comprises providing an extended length of a flexible conveyor comprising an elongated helical drive member sufficiently light to float on said body of liquid, floating said conveyor on said body of liquid, allowing relative movement toward one another of light liquid on the surface of said body and one side of the drive member along the length thereof, rotating said drive member to move liquid toward one end thereof whereby said light liquid is conveyed toward said one end, providing a reservoir for the liquid, and conducting light liquid from said one end of said conveyor into said reservoir.

11. The method of claim 10 including the steps of enclosing the helical drive member in a coextensive length of flexible tubing having an internal diameter affording free rotation of the drive member, and providing lengthwise communication through the wall of the tubing along one side thereof for admitting the light liquid.

12. The method of claim 11 including providing longitudinally positioned buoyant elements on said tubing to facilitate the floating of the conveyor on the body of liquid.

13. The method of claim 11 including the steps of suspending weights from said tubing on drop lines at intervals along its length to facilitate the conveyor's following of wave motion occurring in the body of liquid.

14. The method of claim 10 including the step of providing a continuous inwardly facing pocket on and along the outer helical portion of the driving member for trapping fluid to minimize its displacement outwardly from the driving member.

15. The method of claim 10 including the step of providing at least one fluidtight element within said conveyor along the length thereof, and altering the fluid content of said element to adjust the floating position of the conveyor in the body of heavier liquid.

16. The method of claim 10 including the step of providing two floating vessels, anchoring respective ends of the conveyor to said vessels, locating said reservoir in one of said vessels, applying the power to said drive member at one of the ends thereof, spacing the vessels from one another, and moving the vessels to sweep the conveyor over the area therebetween.

17. A system for removing oil or other light liquid from the surface of a body of water or the like, comprising an extended length of lightweight open flexible screw-type drive member capable of floating on water, means for rotating said drive member to move light liquid along the member toward one end thereof, reservoir means, and means at said one end of said drive member for conducting the light liquid into said reservoir means.

18. The system of claim 17 wherein said means for conducting the light liquid into said reservoir means utilizes a portion of said drive member.

19. The system of claim 17 including means for sweeping said drive member laterally over the surface of the body of liquid.

20. The system of claim 19 wherein said sweeping means comprises two motor-driven vessels, said drive member being rotatably connected to one of said vessels, and said reservoir and said rotating means being located in the other of said vessels.

21. The system of claim 17 wherein said means for conducting liquid into said reservoir includes a flexible tube closely surrounding said drive member adjacent said one end.

22. The system of claim 17 wherein said drive member comprises a helix of uniform diameter and is formed to provide an inwardly facing channel along the forward edge of the helix adjacent the outer portion thereof for minimizing the outward lateral movement of liquid from said drive member.

23. The system of claim 17 including means for changing the buoyancy of said drive member to adjust the level of admission of the lighter fluid to said drive member.

24. The system for removing oil or other light liquids from the surface of a body of water or the like, comprising an extended length of lightweight flexible screw-type fluid driving member capable of floating on water, a flexible tubular casing surrounding said drive member and having an internal diameter affording free rotation thereof, means affording the admission of light liquid from the surface of the body of liquid longitudinally along said tubing, means for sweeping the tubing laterally over the surface of the body of liquid, said sweeping means comprising a motor-driven vessel, outrigger floats connected to said tubing for maintaining said tubing in position with the openings along the length thereof on the side toward the direction of movement of said vessel, means including bridle lines connecting said floats and said vessel for maintaining said tubing in a sweeping position, a reservoir on said vessel, and drive means on said vessel for rotating said driving member in a direction to move liquid through said tubing and into said reservoir.

25. The system of claim 24 wherein said bridle means includes a boom extending laterally from said vessel on the side toward said tubing and lines connecting said boom and said floats.

26. A helical conveyor assembly for collecting and removing a liquid floating on the surface of a body of heavier liquid comprising a lightweight highly flexible elongated helical drive member, a flexible tube enclosing said member and having an internal diameter affording free rotation of said member therein, said tubing having an opening extending longitudinally thereof for admitting liquid to said helical member substantially throughout its length, and buoyant members secured to said tube along the sides thereof for facilitating the floating of said assembly on a body of liquid with the longitudinal opening adjacent the surface of the body of liquid for admitting the floating lighter liquid to the interior of said tube whereby rotation of said helical member produces a flow of the lighter liquid within said tube toward one end thereof.

27. The conveyor assembly of claim 26 wherein said tube is formed with an offset hollow extension extending longitudinally along the top thereof and said longitudinal opening is provided in one side of said extension.

28. The conveyor assembly of claim 26 wherein said tube comprises a wall of flexible sheet material and at least one helical wire wrapped around the wall for the length of the tube and bonded to the wall, and wherein said elongated opening is formed as a series of slots in said wall each extending between turns of said wire.

29. The conveyor assembly of claim 26 including drop weights suspended from said tube at intervals along the length thereof for facilitating the flexing of said assembly to conform to wave action on the surface of the body of liquid.

* * * * *